Patented Oct. 7, 1947

2,428,495

UNITED STATES PATENT OFFICE 2,428,495

SAUSAGE COVERING AND METHOD OF FORMING THE SAME

Jean N. Lesparre and Roy E. Carlson, Chicago, Ill., assignors to Armour and Company, Chicago, Ill., a corporation of Illinois No Drawing. Application May 17, 1943, Serial No. 487,334

10 Claims. (Cl. 99—175)

This invention relates to coverings for encased food products such as sausages and to methods for forming and applying the same. The invention is also concerned with methods for the production of sausage products in which the special coating material is employed.

In the preparation and marketing of sausages there is frequently great difficulty due to molds, discoloration and deterioration, resulting in a substantial amount of spoilage. Especially is this true in the case of the Italian type sausages wherein the meat is stuffed into natural or artificial casings and is then dried for an extended period, which may be three months or more. As a usual thing, the sausage of this dried or Italian type has a light tan color when viewed through the casing and if it is sliced it is usual to see a tannish or brownish color at the surface of the meat adjacent the casing while the interior has more of a pinkish cast. Such a discoloration is objectionable and renders the product unsightly and less attractive.

It is an important object of this invention to provide a treatment which will avoid the mold and discoloration and thus eliminate the spoilage which has heretofore been common. Another object is to provide a special coating suitable for use in such treatment and to provide a method for preparing such a coating. Yet another object is to provide an improved meat treating process in which the special coating may be used to advantage.

It has heretofore been suggested that the sausages be coated with paraffin or similar materials for the prevention of mold and discoloration during treatment. However, this practice has not been found satisfactory and in fact appears to produce even more spoilage than would be the case if no coating at all were used.

We have discovered that by applying to the sausages or other encased food products a special coating which may later be removed, the disadvantages above expressed may be substantially overcome and a greatly improved product can be obtained.

According to our invention the special coating is applied to the surface of the sausage or other encased food in the form of a continuous layer. This provides a coating which is substantially impervious to water and liquids and yet at the same time is pervious to vapors so as to permit breathing of the sausage meat or other filling material. Another characteristic of the special coating is that it may be easily removed from the sausages before they are marketed, to leave them free of any extraneous material and without any injury or objectionable changes in the surface of the casings.

One good way to apply the improved coating is to dip the sausage or other encased product in a specially prepared solution and then to allow the product to dry, making a continuous layer covering the surface of the product; or the coating of the special covering material may be applied in any other suitable manner.

The solution used for coating the products may preferably contain a mixture of water, gelatin and a suitable water-insoluble non-toxic salt which is preferably in the form of finely divided particles. The salt which is used may be a water-insoluble salt of an alkaline earth metal, such, for example, as calcium carbonate, magnesium carbonate or barium sulfate. Calcium carbonate has been found to be particularly suitable for use in this solution. The term "solution" as used herein is intended to include a colloidal suspension, as in the case of gelatin, and a dispersion of small particles of a water-insoluble substance throughout the water, as in the case of calcium carbonate.

The gelatin used in this solution may be of any suitable type, and a gelatin of 225 Bloom has been found satisfactory.

The proportions of the ingredients may be varied according to the type of covering which is desired. A suitable composition may include 2 to 3 parts of gelatin to each part of the water-insoluble non-toxic salt, and 6 to 8 parts of water may be incorporated in this mixture, all of the proportions given being by weight.

If desired, glycerine may be added to the mixture and when so added may be present in the proportion of about two parts of glycerine to each part of the water-insoluble salt. Also, small quantities of sodium chloride may be added to advantage, and a gum adhesive and alcohol may be added with beneficial results.

The solution may be prepared by mixing all of the ingredients together and heating all the ingredients together to a temperature of at least 130° F. and preferably in the neighborhood of 140° F. the mixture being varied throughout the operation.

Another method of preparing the mixture is to heat the water to a temperature of approximately 125° F., and then add the calcium carbonate and other ingredients except the gelatin, agitate the solution, and raise the temperature to approximately 140° F. The gelatin may then be added while the agitation or stirring is continued.

After the mixture has been formed and all of the constituents intimately distributed throughout the same, the solution may be cooled to a temperature below 125° F., preferably between 105° F. and 115° F., the agitation being preferably continued during the cooling to maintain the uniform dispersion of the ingredients within the mixture. The sausage may then be dipped in the solution. The depth of the coating which is formed on the sausage casing may be regulated to a large extent by the temperature of the solution at which the dipping takes place. The lower the temperature at which the dipping operation is carried out, the thicker will be the coating that is applied. If desired, the sausage may be dipped two or more times in order to apply successive coatings of the solution. For example, approximately 10 ounces of the coating may be applied to a sausage weighing about 9 pounds when the sausage is double dipped, whereas when only a single coating is applied approximately 6½ ounces of the coating material may be applied to the same sausage. Any other suitable means of applying the solution to the casing of the sausage may, of course, be used.

The coating may be of any desired thickness, although it should be in the form of a continuous layer so as to cover substantially the entire surface of the sausage. Also, the covering should be adapted to be removed without disturbing the structure of the casing surface. Before the sausages are marked the special covering may be easily stripped or peeled off from the sausage casing in self-sustaining portions.

The special coating material may be applied to any encased meat product as desired, although it is particularly advantageous in connection with the dry or Italian type sausages. In the case of the dry sausages, the casings are stuffed with the meat and the special coating is applied in some manner such as that already described. The coated sausages are then subjected to an extended drying treatment which may be for 60 or 90 days, for example, and during this extended drying step the coating prevents bacterial damage and other deterioration near the surface, while at the same time it permits the passage of vapors resulting from the moisture evaporation. One of the important effects of the coating is to prevent the discoloration or browning effect of the outer meat surface and to maintain the original color of the meat throughout. Mold formation and other objectionable bacterial effects are also avoided. After the drying step, the coating may be peeled or sloughed off in the form of fairly large flakes to leave the product clean and with its natural pinkish bloom.

Although the invention has been described in connection with specific embodiments, it will be apparent that many changes and modifications may be made without departing from the spirit of the invention.

What we claim as new and desire to secure by Letters Patent is:

1. A method of coating sausages, comprising heating and agitating a mixture of gelatin, calcium carbonate and a major proportion of water at a temperature in excess of 130° F., said gelatin being greater in amount than said calcium carbonate, cooling the mixture to a temperature below 125° F. while maintaining the mixture in the liquid state, and dipping a sausage in the mixture to form thereon a coating of a continuous layer of the mixture.

2. A method of coating sausages, comprising heating and agitating a mixture of gelatin, calcium carbonate, glycerin and a major proportion of water at a temperature in excess of 130° F., said gelatin being greater in amount than said calcium carbonate, cooling the mixture to a temperature below 125° F. while maintaining the same in the liquid state, and dipping a sausage in the liquid mixture to apply thereto a coating of a continuous layer of the mixture.

3. A method of coating sausages, comprising mixing gelatin, glycerin and water-insoluble nontoxic salt of an alkaline earth metal, a small quantity of sodium chloride, a small quantity of alcohol, a small quantity of a gum binder, and a major proportion of water, said gelatin being greater in amount than said salt, heating the mixture while agitating the same to a temperature in excess of 130° F., cooling the mixture to a temperature between 105° F. and 115° F., and dipping a sausage in the mixture to apply to the surface of the sausage a coating of a continuous layer of the mixture, the coating adhering to the surface of the sausage and being removable therefrom in self-sustaining portions.

4. A method of coating sausages, comprising heating a mixture of approximately one part of calcium carbonate, two parts of glycerin, three parts of gelatin, and eight parts of water to a temperature in the neighborhood of 140° F., agitating the mixture, cooling the mixture to a temperature between 105° F. and 115° F., dipping a sausage in the mixture to apply thereto a coating of the mixture, and cooling the coated sausage to form thereon a dry continuous layer of the coating mixture, the coating adhering to the surface of the sausage and being removable therefrom in self-sustaining portions.

5. In combination, a sausage and a coating adhering to the surface of the sausage and removable therefrom in self-sustaining portions, said coating consisting of a liquid-impervious vapor-permeable dry continuous layer of a mixture of approximately one part of calcium carbonate, two parts of glycerin and three parts of gelatin, all of the constituents of the mixture being intimately admixed.

6. A method of coating sausages, comprising subjecting a mixture of gelatin, calcium carbonate in an amount less than said gelatin, and a major proportion of water to a temperature in excess of 130° F. while agitating the same, cooling the mixture to a temperature below 125° F. while maintaining the mixture in the liquid state, and dipping the sausage in the mixture to form thereon a coating of a continuous layer of the mixture, the coating adhering to the surface of the sausage and being removable therefrom without affecting the surface of the sausage.

7. In combination, a dried sausage and a water-impervious vapor-permeable dry continuous self-sustaining coating extending about said sausage and adhering to the outer surface thereof said coating consisting of gelatin and a water-insoluble salt of an alkaline earth metal in the proportions of at least two parts of gelatin to one part of said salt.

8. In combination, a dried sausage and a water-impervious vapor-permeable dry continuous self-sustaining coating extending about said sausage and adhering to the outer surface thereof, said coating being removable from the surface of the sausage in self-sustaining portions and comprising a mixture of from two to three parts of gelatin, about two parts of glycerine, and about one part of a water-insoluble salt of an alkaline earth metal wherein all the constituents of the mixture are intimately admixed.

9. A sausage having a coating comprising a liquid-impervious vapor-permeable continuous self-sustaining layer of a mixture of gelatin, glycerin, and a water-insoluble salt of an alkaline earth metal, said salt being less in amount than said gelatin, and all of the constituents of the mixture being intimately admixed.

10. A sausage having a coating comprising a liquid-impervious vapor-permeable continuous self-sustaining layer of a mixture of gelatin, glycerin, a small quantity of a gum binder, and finely-divided particles of calcium carbonate in amount less than said gelatin, all of the constituents of the mixture being intimately admixed.

JEAN N. LESPARRE.
ROY E. CARLSON.

REFERENCES CITED

The following references are of record in the file of this patent:

UNITED STATES PATENTS

| Number | Name | Date |
|---|---|---|
| 1,148,823 | Bocande | Aug. 3, 1915 |
| 990,113 | Cowin | Apr. 18, 1911 |
| 1,009,650 | Delius | Nov. 21, 1911 |
| 711,990 | Markovits et al. | Oct. 28, 1902 |
| 1,914,351 | Hall et al. | June 13, 1933 |
| 1,072,406 | Gorin | Sept. 2, 1913 |
| 1,765,485 | Hasselblad | June 24, 1930 |

FOREIGN PATENTS

| Number | Country | Date |
|---|---|---|
| 16,434 | Australia | 1934 |

OTHER REFERENCES

Wilder-Modern Packing House, page 340, Chicago, 1905.